Aug. 11, 1964
R. L. SHARP ETAL
3,144,590
FREQUENCY SELECTIVE NETWORKS
Filed June 13, 1958
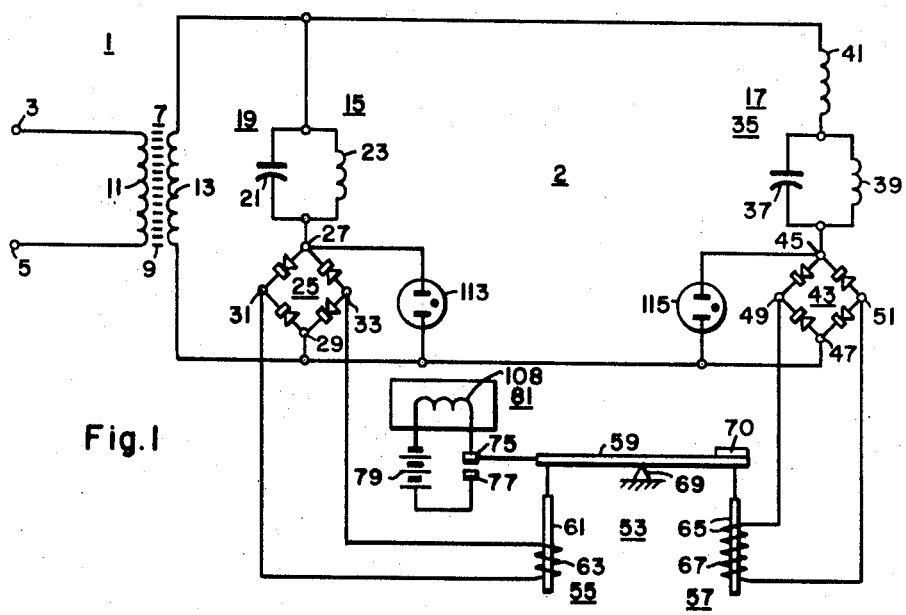
Fig.1
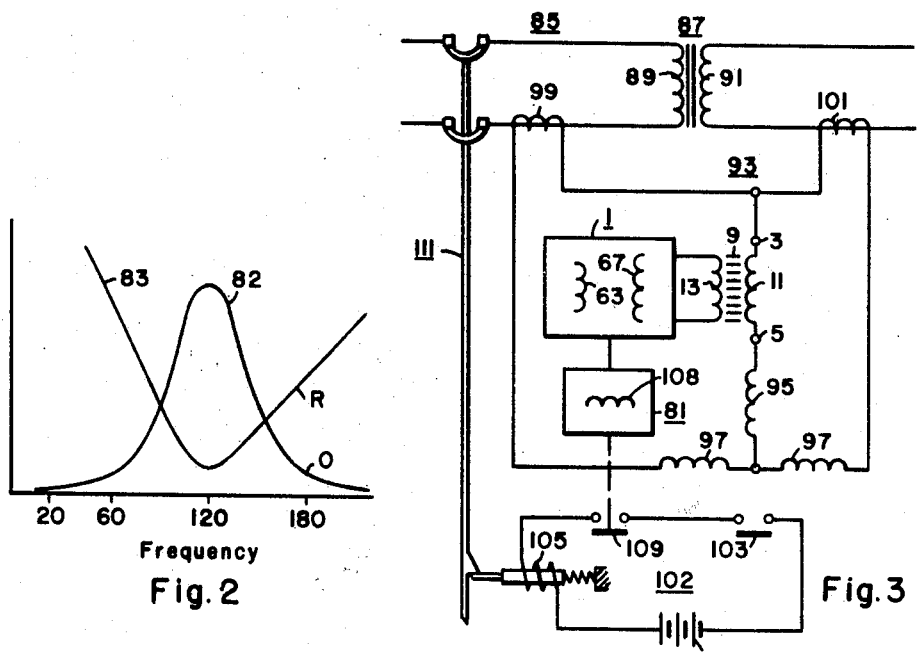
Fig.2
Fig.3
WITNESSES
John E. Headly Jr.
James F. Young
INVENTORS
William E. Glassburn &
Robert L. Sharp
BY
David M. Schiller
ATTORNEY

United States Patent Office 3,144,590
Patented Aug. 11, 1964

1

3,144,590
FREQUENCY SELECTIVE NETWORKS
Robert L. Sharp, Pequannock, and William E. Glassburn, Mountainside, N.J., assignors to Westinghouse Electric Corporation, East Pittsburgh, Pa., a corporation of Pennsylvania
Filed June 13, 1958, Ser. No. 741,854
12 Claims. (Cl. 317—138)

This invention relates to frequency selective networks and has particular relation to networks for controlling the operation of translating means associated with the network in accordance with the frequency of currents energizing the network.

In the present invention, an improved frequency selective network is provided for preventing operation of associated translating means in response to currents of a preselected frequency while permitting such operation in response to currents of other frequencies to which the network is subjected. The network of the present invention includes a pair of parallel connected circuit means each of which presents an impedance to current therethrough which varies in response to changes in the frequency of such currents. The circuit means are connected in parallel relation with a source of variable frequency voltage for energization by currents derived from such source.

Any suitable translating device may be associated with the selective network. In a preferred embodiment of the invention, a direct current relay is associated with the network. The relay may be of the type which includes operating and restraining winding means for controlling operation of an associated operated element. In the present invention, the operating and restraining winding means are each connected for energization by a direct current derived from a separate one of the parallel connected circuit means. The operated element is arranged to be operated when the ampere-turns developed by current through the operating winding means exceeds the ampere-turns produced by current traversing the restraining winding means. When the restraining ampere-turns is greater than the operating ampere-turns, the operated element is restrained against operation.

The parallel connected circuit means preferably include resonant networks to provide the desired frequency selectivity. For this purpose, the circuit means associated with the restraining winding means may include a series resonant network which is designed for resonance at the frequency for which operation of the operated element is to be restrained. The other circuit means associated with the operating winding means includes a parallel resonant network which is designed for resonance at this particular frequency.

The frequency selective network of the present invention may be employed to advantage to supervise the operation of differential relays which are employed to protect apparatus such as transformers. Such differential relays may be subject to false operations in response to initial energization of the associated transformer to falsely trip a circuit breaker for disconnecting the transformer. This is due to the passage of currents through the operating element of the differential relay resulting from the inrush of magnetizing current to the protected transformer.

The frequency selective network may be utilized to prevent energization of the circuit breaker trip coil in response to such false operations when the associated transformer

2 is initially energized. For this purpose, the selective network may be designed such that its associated operated element is restrained against operation to prevent energization of the trip coil when the network is energized by current having more than a preselected percentage of a second harmonic frequency. It has been observed that magnetizing inrush currents always contain a second harmonic component. This component is employed in the present invention to restrain the operated element against operation.

Operation of the operated element may be employed to actuate a switch which is in series relation with a switch actuated in response to operation of the differential relay. The breaker trip coil may be connected in series relation with these two switches to be energized only when the two switches are simultaneously in a closed condition. Consequently, when the operated element associated with the frequency selective network is restrained against operation, its associated switch will remain open to prevent energization of the breaker trip coil.

In the present invention the input terminals of the selective network are connected to be energized in accordance with current energizing the operating winding of the differential relay. With this arrangement current having a second harmonic component will energize the selective network when the associated transformer is initially energized.

The selective network is also designed to permit energization of the breaker trip coil for all frequencies below the normal frequency of the current energizing the protected transformer. This is advantageous inasmuch as the associated circuit breaker may effectively operate in response to faults of the transformer which occur during prewarming periods of generators associated with the transformer. During such times, the currents energizing the transformer have frequencies which are less than the normal frequency of the energizing currents.

It is therefore an object of the invention to provide an improved frequency selective network for presenting different impedances to currents of various frequencies to which the network is subjected.

It is another object of the invention to provide a frequency selective network effective for operating an associated translating device in response to currents of frequencies other than a preselected frequency to which the network is subjected.

It is a further object of the invention to provide a system including a network connected to operate a direct current relay when energized by currents having a frequency other than a preselected frequency and to restrain operation of the relay in response to the preselected frequency.

It is still another object of the invention to provide a relay system including a differential relay for protecting a transformer with a frequency selective network of improved construction arranged to prevent operation of an associated circuit breaker in response to false operation of the differential relay when the transformer is initially energized.

It is still another object of the invention to provide a system as defined in the preceding paragraph wherein the selective network is effective to permit operation of the circuit breaker upon the occurrence of internal faults of the transformer occuring under normal energization of the transformer as well as under energization of the transformer by currents having frequencies less than the normal energizing frequency.

Other objects of the invention will become apparent from the following description taken in conjunction with the accompanying drawings in which:

FIGURE 1 is a schematic representation of a frequency selective system constructed in accordance with the invention;

FIG. 2 is a graphical representation illustrating certain electrical quantities present in the network of FIG. 1; and FIG. 3 is a schematic representation of a relay system including the network of FIG. 1.

Referring to the drawings, there is illustrated in FIG. 1 a frequency selective system represented generally by the numeral 1 constructed in accordance with the teachings of the present invention. The system 1 includes a network which is represented generally by the numeral 2 having a pair of spaced input terminals 3 and 5 for supplying energization to a suitable transformer 7.

The transformer 7 may be of the air gap type including a magnetic core 9 of any suitable magnetic material having an air gap such that saturation of the core is prevented over a substantial range of energizations of the input terminals 3 and 5. The transformer 7 includes further a primary winding 11 and a secondary winding 13 which surround the core in inductive relation with each other.

The network 1 also includes a pair of parallel connected frequency responsive circuit means 15 and 17. These circuit means are connected to be energized by currents derived from voltage induced in the secondary winding 13 resulting from energization of the terminals 3 and 5. Each of the circuit means 15 and 17 may include a frequency responsive network which presents an impedance to current traversing the network which varies in response to changes in the frequency of such current.

As will appear hereinafter the network 1 may be employed to control operation of a suitable translator such as a direct current relay having operating and restraining means. In the present invention, the network 1 is employed to restrain operation of the relay for a particular frequency, and to permit operation of the relay unit for other frequencies applied to the network 1.

In the preferred embodiment of the invention illustrated, the circuit means 15 includes a parallel resonant network 19 having a condenser 21 and an inductance 23 connected in parallel relation with the condenser. In the present invention, the network 19 is designed to resonate at a preselected frequency for which operation of the associated relay unit is to be prevented. As will presently appear, the network 19 may be selected to resonate at a frequency of substantially 120 cycles per second for a particular application of the network 1.

In order to derive a direct current quantity from the alternating quantity which traverses the network 19, a suitable rectifying device 25 is connected for energization by the alternating current traversing the network 19. The device 25 includes a pair of input terminals 27 and 29 connected in series relation with the network 19 to constitute a portion of the circuit means 15. The device 25 may be of the full-wave bridge type including a pair of output terminals 31 and 33. These output terminals may be connected to the operating means of the associated relay unit as will presently appear.

The circuit means 17 includes a network 35 which is designed to present a high impedance to currents having frequencies which are to cause operation of the associated relay unit. For this purpose, the network 35 may be in the form of a parallel resonant network designed to resonate at a particular frequency for which operation of the relay unit is desired. This network includes a condenser 37 connected in parallel relation with an inductance 39. For the particular application previously mentioned, the network 35 may be selected to exhibit a maximum impedance to currents having a frequency of approximately 60 cycles per second.

The present invention further provides that the circuit means 17 includes a network presenting a minimum impedance to currents having a frequency for which operation of the associated relay unit is to be prevented. To this end the circuit means 17 may include a series resonant network designed to exhibit a minimum impedance to currents having this frequency, which may, for example, be substantially 120 cycles per second. Conveniently, this network may comprise the series connection of an inductance 41 and the network 35.

The circuit means 17 may include a rectifying device 43 which is similar to the device 25. The device 43 includes input terminals 45 and 47 connected in series relation with the network 35 for energization by alternating currents traverse the network 35. The device 43 is illustrated as being of the full-wave bridge type including output terminals 49 and 51. These output terminals may be connected to the restraining means of the associated relay unit.

The relay unit previously referred to is represented generally by the numeral 53 and is connected for energization by the direct currents appearing at the output terminals of the rectifier devices 25 and 43. The unit 53 may be of any suitable construction and is illustrated in the form of a direct current balanced beam relay unit having operating and restraining means 55 and 57, respectively. If desired, the unit 53 may comprise a direct current polar relay.

As illustrated in FIG. 1, the relay 53 may include an operated element 59 in the form of a bar supported for pivotal movement by a suitable knife edge 69. A pair of spaced magnetic bars 61 and 65 are attached to the bar 59 at its ends in any suitable manner to be suspended in vertical positions as viewed in FIG. 1. The bars 61 and 65 may be formed of any suitable magnetic material. A pair of electroconductive windings 63 and 67 surround respectively the bars 61 and 65 in order to effect vertical displacement of the bars 61 and 65 when the windings are energized. When the two windings are energized to produce different ampere-turns the associated bar will be displaced vertically in a downward direction to thereby effect pivotal movement of the bar 59 about the knife edge 69. As will appear hereinafter, the winding 67 is preferably provided with a greater number of turns than the winding 63 for a particular application of the invention.

In order to control operation of the relay 53 in accordance with the frequency of currents energizing the terminals 3 and 5, the windings 63 and 67 are connected respectively for energization by currents traversing the circuit means 15 and 17. For this purpose, the operating winding 63 is connected across the output terminals 31 and 33 of the device 25 of the circuit means 15. The restraining winding 67 of the relay 53 is connected across the terminals 49 and 51 of the device 43 of the circuit means 17. The arrangement is such that the operated element 59 will be moved to an operated position when the ampere-turns produced by energization of the winding 63 exceeds the ampere-turns produced by energization of the winding 67. When the winding 67 is energized to produce ampere-turns greater than the ampere-turns developed by current energizing the winding 63, the element 59 is restrained against operation.

The element 59 may have an electroconductive contact 75 attached thereto in any suitable manner for movement therewith with respect to a fixed electroconductive contact 77. These two contacts are arranged for engagement when the element 59 is operated, and may be included in a series circuit which also includes a battery 79 and suitable translating means 81 which may be in the form of a relay coil 108. When the network 1 is deenergized, the member 59 is in its neutral position as illustrated in FIG. 1. When the ampere-turns of the operating winding 63 exceeds that of the restraining winding 67, the element 59 is pivoted such that the contact 75 is moved into engagement with the contact 77 to thereby permit energization of the translating means 81. However, when the ampere-turns of the winding 67 is equal to or greater than that of the winding 63, the contact 65 is spaced from the contact 77 to thereby prevent energization of the translating means 81. A suitable weight 70 may be secured to the bar 59 to balance the weight of the contact 75.

As shown in FIG. 1 a pair of neon lamps 113 and 115 are connected across the alternating current terminals of the devices 25 and 43 respectively. This arrangement prevents the devices 25 and 43 from being subjected to excessive currents and voltages. If the applied currents and voltages become excessive, the lamps will light and reduce such currents and voltages.

Referring now to FIG. 2, there is illustrated a graphical representation showing the relationship between certain electrical quantities in the network 1. In FIG. 2, the ordinate represents the impedance presented by the circuit means 15 and 17 to current passing therethrough. The abscissa represents the frequency of the currents traversing the circuit means 15 and 17. The representation of FIG. 2 illustrates a curve 82 which depicts the variation of impedance presented to currents traversing the circuit means 15 as a result of changes in the frequency of such currents. A curve 83 depicts the variation of impedance presented to currents traversing the circuit means 17 in response to changes in the frequency of these currents.

It is observed with reference to FIG. 2 that the curves 82 and 83 depict maximum and minimum impedance points for the same particular frequency which may be 120 cycles per second for a particular application described hereinafter. For this application, the curve 82 shows a maximum impedance point for this frequency whereas the curve 83 shows a minimum impedance point for this same frequency. With this arrangement, then, the ampere-turns of the restraining winding 67 will be considerably greater than that of the operating winding 63 with the result that the relay 53 is in a restrained condition for a frequency of 120 cycles per second.

FIG. 2 further reveals that for frequencies of approximately 60 cycles per second and below, and for frequencies of approximately 180 cycles per second and above, the impedance presented by the circuit means 15 is less than the impedance presented by the circuit means 17. The arrangement is such that for these frequencies, the ampere-turns of the winding 63 exceeds that of the winding 67 with the result that the element 59 is in an operated condition to permit energization of the translating means 81. It is to be understood that the network 1 may be designed such that the minimum and maximum impedance points occur for any desired frequency. Furthermore, the design of the network 1 may be such that any desired selectivity may be exhibited by the circuit means 15 and 17.

The network 1 may be employed in a number of various applications. For example, the network 1 may be utilized to supervise the operation of a differential relay which is employed to protect apparatus such as a transformer device. When a differential relay is utilized to protect a transformer, the relay may be subjected to false operations for falsely operating an associated circuit breaker during initial energization of the transformer when magnetizing inrush currents are supplied to the transformer. It has been observed that such inrush currents possess a high percentage of a second harmonic frequency. The network 1 may be arranged to respond to such second harmonic current to prevent operation of the circuit breaker in response to operation of the differential relay when the transformer is initially energized.

In this particular application, the network 1 is designed such that the operated element 59 is restrained against operation when the second harmonic current exceeds approximately 15% of the fundamental frequency current to prevent operation of an associated circuit breaker. For this purpose the winding 67 is preferably provided with approximately six and two-thirds times the number of turns provided for the winding 63.

In FIG. 3, in which like characters have been used to designate like parts of FIG. 1, there is illustrated a relaying system associated with an alternating current circuit 85 which may for example, operate at a frequency of sixty cycles per second. The circuit 85 includes a transformer 87 having primary and secondary windings 89 and 91 respectively. In order to protect the transformer 87 against internal faults, a differential relay 93 of any suitable construction may be associated with the transformer.

The relay 93 is conventional and may include an operating winding 95 and a pair of restraining windings 97. The windings 95 and 97 act upon a suitable operated element (not shown) to respectively operate and restrain the operated element which controls the switch 103. In FIG. 3, the windings 95 and 97 are shown to be connected for energization in accordance with currents in the circuit 85 through suitable current transformers 99 and 101 responsive to primary and secondary currents of the transformer 87.

Under normal energizing conditions of the transformer 87, the winding 95 is in a deenergized condition and the relay 93 will not operate. However, when an internal fault of the transformer 87 occurs, current will flow through the operating winding 95, and currents will flow in opposite directions through the windings 97 to thereby cause operation of the differential relay. This operation may be employed to operate a circuit breaker 111 to disconnect the transformer 87.

It has been observed that when the protected transformer is initially energized, current flows through the winding 95 effective to operate the relay to thereby falsely operate the breaker 111. In order to prevent establishment of a trip circuit 102 for the breaker 111 upon the occurrence of inrush currents to the transformer 87 when the transformer is initially energized, the present invention provides that the translating means 81 of the relay 53 includes a winding 108 arranged to actuate when energized a switch 109 which is connected in the circuit 102 in series relation with a switch 103 actuable in response to operation of the relay 93. It will be apparent that these elements have been previously described in connection with FIG. 1 and are part of system 1 thereof. The switches 103 and 109 may be connected in series in the circuit 102 with a battery 107 and a trip coil 105 which may be arranged to actuate when energized the circuit breaker 111.

As previously stated false operation of the relay 93 occurs as a result of the passage of currents through the winding 95 of the relay 93 during initial energization of the transformer 87. For a normal operating frequency of 60 cycles per second of the circuit 85, the second harmonic current will have a frequency of 120 cycles per second. In order to supervise operation of the relay 93, the network 1 is connected to be energized in accordance with energization of the winding 95. For this purpose, the primary winding 11 of the network 1 may be connected in series relation with the winding 95.

With the network 1 designed as described previously, actuation of the switch 109 will be prevented in response to energization of the network 1 by currents which have a frequency of 120 cycles per second, and which have a value exceeding approximately 15% of the value of the fundamental current. This arrangement will prevent energization of the trip coil 105 to thereby prevent actuation of the circuit breaker 111. As described previously, the network 1 may be designed such that when substantially zero current traverses the terminals 3 and 5 the operated element 59 will be in its neutral position as illustrated in FIG. 1. Consequently, during normal energization of the transformer 87, the element 59 will be in such neutral position since substantially zero current traverses the windings 95 and 11 during such normal energization.

It is desirable that the breaker 111 is tripped in response to internal faults of the transformer 87 occurring during times when the frequency of the circuit 85 is less than the normal frequency thereof, such as 60 cycles per second. Such low frequency operation may occur during periods when a generator energizing the transformer 87 is initially operated. If a fault should occur during such periods, the current through the winding 63 will be sufficient to produce ampere-turns of the winding 63 which exceed the ampere-turns of the winding 67 to operate the element 59 and to thereby actuate the switch 109. This arrangement then will allow energization of the coil 105 when the switch 103 is actuated as a result of operation of the relay 93.

As previously stated during times when the transformer is normally energized substantially zero current will flow through the terminals 3 and 5 of the network 1. Consequently, for this normal condition the operated member 59 will be in its neutral position, and the switch 109 will be open. The network 1 is designed such that for a normal frequency of 60 cycles per second the member 59 is operated only when a preselected amount of current flows through the terminals 3 and 5. This preselected amount is preferably less than the amount of current required to operate the relay 93 in response to internal faults of the transformer 87.

Although the invention has been described with reference to certain specific embodiments thereof, numerous modifications are possible and it is desired to cover all modifications falling within the spirit and scope of the invention.

We claim as our invention:

1. In an electrical frequency selective system responsive to an alternating voltage input presenting simultaneously a base frequency and at least one secondary frequency greater than said base frequency of alternation, a parallel resonant circuit connected to be energized by current derived from said input, said parallel resonant circuit being designed to resonate at a preselected frequency greater than said base frequency, a series resonant circuit connected to be energized by current derived from said input, said series resonant circuit being designed to resonate at said preselected frequency, said series resonant circuit including a parallel resonant portion designed to resonate at said base frequency, said series circuit having minimum impedance to unidirectional current, and translating means including a pair of elements, a first of said elements being connected for energization in accordance with the current flowing through said parallel circuit and the second of said elements being connected for energization in accordance with the current flowing through said series circuit, said second element being operable upon energization to render said first element ineffective.

2. In an electrical frequency selective system for connection to an alternating voltage simultaneously presenting a fundamental and at least a second harmonic frequency of alternation, a parallel resonant circuit connected to be energized by current derived from said input means, said parallel resonant circuit being designed to resonate at the second harmonic frequency of said fundamental frequency, a series resonant circuit connected to be energized by current derived from said input means, said series resonant circuit being designed to resonate at said second harmonic frequency, said series resonant circuit including a frequency trap designed to provide a high impedance to said fundamental, said series circuit having minimum impedance to unidirectional current, and a relay including operating and restraining elements each connected for energization in accordance with the current traversing a separate one of said resonant circuits.

3. In an electrical frequency selective system, for use with an alternating voltage network presenting fundamental and harmonic frequencies of alternation, a first frequency responsive circuit means connected for energization by a first current from said input means, said first circuit means presenting an impedance which is a function of the frequency of voltage applied thereto, said first circuit means being designed to present a maximum impedance to a preselected frequency of said alternating voltage and minimum impedance to unidirectional current, second frequency responsive circuit means connected for energization by a second current from said input means, said second circuit means presenting an impedance which is a function of the frequency of voltage applied thereto, said second circuit means being designed to present a minimum impedance in a frequency range closely adjacent said preselected frequency of said voltage means and to present a substantial impedance at all other frequencies above said fundamental frequency, and a relay including operating means, restraining means, and operated means movable to an operated position in response to different energizations of said operating means and restraining means, each of said operating means and restraining means being energized in accordance with the current traversing a separate one of said first and second circuit means, said operating means, restraining means and circuit means being designed such that said operated means may be moved to an operated position by said fundamental frequency in the absence of said preselected harmonic frequency.

4. In an electrical frequency selective system for use with an alternating voltage presenting a fundamental frequency and harmonic frequencies of alternation, first frequency responsive circuit means connected for energization by a first current derived from said alternating voltage, said first circuit means presenting an impedance to said first current which is dependent upon the frequency of the potential supplied thereto, said first circuit means being designed to present a maximum impedance to said first current for a preselected harmonic frequency of said voltage means and a minimum impedance to unidirectional current, second frequency responsive circuit means connected for energization by a second current derived from said alternating voltage, said second circuit means presenting an impedance to said second current which is dependent upon the frequency of the potential supplied thereto, said second circuit means being designed to present a minimum impedance to said second current for said preselected frequency of said voltage means, and a relay including operating means and restraining means each connected for energization and deenergization in accordance with the ratio of the current traversing separate ones of said first and second circuit means, said restraining means being effective to restrain said operating means at current magnitudes less than the current magnitude supplied to said operating means.

5. In an electrical frequency selective system for use with an alternating voltage simultaneously presenting a fundamental and secondary frequencies of alternation, a first parallel resonant circuit connected for energization by current derived from said input means, said first parallel resonant circuit being designed to resonate at said secondary frequency, a second circuit connected for energization by current derived from said input means, said second circuit including a series resonant circuit portion designed to resonate at said secondary frequency, said second circuit further including a second parallel resonant circuit portion designed to resonate at said fundamental frequency, said second circuit presenting a minimum impedance to unidirectional current, and translating means including a first element connected for energization in accordance with currents traversing the first circuit, and a second element connected for energization in accordance with currents traversing the second circuit.

6. In an electrical frequency selective system for use with an alternating voltage simultaneously presenting a fundamental and secondary frequencies of alternation, a first path including a first parallel resonant circuit connected for energization by current derived from said input means, said first parallel resonant circuit being designed to resonate at said secondary frequency, a second path including a series resonant circuit portion connected for energization by current derived from said input means, said series resonant circuit portion being designed to resonate at said secondary frequency, said second path including a second parallel resonant circuit portion connected for energization by current derived from said input means, said second parallel resonant circuit portion being designed to resonate at said fundamental frequency, said second parallel resonant circuit portion comprising a portion of said series resonant circuit portion, said second path presenting a minimum impedance to unidirectional current, and translating means including a pair of elements each connected for energization in accordance with the current traversing a separate one of said paths.

7. In an electrical frequency selective system, alternating voltage input means presenting different frequencies of alternation, first and second circuit means each connected for energization by currents produced by said voltage means, each of said circuit means presenting an impedance to its energizing current which varies in response to changes in said frequency, and translating means including an operated member, a restraining winding connected for energization in accordance with current traversing one of said circuit means, and an operating winding connected for energization in accordance with current traversing the other of said circuit means, said translating means being arranged such that said operated member is operated when the ampere-turns of the operating winding exceeds that of the restraining winding, each of said circuit means and windings being arranged such that for a nominal frequency of said voltage means current energizing said operating winding produces ampere-turns greater than the ampere-turns developed by current energizing said restraining winding to thereby operate said operated element, each of said circuit means and windings being further arranged such that solely for the second harmonic of said nominal frequency current energizing said restraining winding produces ampere-turns greater than ampere-turns developed by current energizing said operating winding to thereby restrain operation of said operated element.

8. In an electrical frequency selective system, alternating voltage input means presenting different frequencies of alternation, first and second circuit means each connected for energization by currents produced by said voltage means, each of said circuit means presenting an impedance to its energizing current which varies in response to changes in said frequency, and translating means including an operated member, a restraining winding connected for energization in accordance with current traversing one of said circuit means, and an operating winding connected for energization in accordance with current traversing the other of said circuit means, said translating means being arranged such that said operated member is operated when the ampere-turns of the operating winding exceeds that of the restraining windings, each of said circuit means and windings being arranged such that for frequencies at and below said nominal frequency current energizing said operating winding produces ampere-turns greater than the ampere-turns developed by current energizing said restraining winding to thereby operate said operated element, each of said circuit means and windings being further arranged such that for the second harmonic of said nominal frequency current energizing said restraining winding produces ampere-turns greater than ampere-turns developed by current energizing said operating winding to thereby restrain operation of said operated element, said restraining winding having a preselected greater number of turns than said operating winding.

9. A relay apparatus for an alternating potential system having a fundamental frequency, a pair of input terminals adapted to be energized from the potential of the system, a relay including a switch and an operating and a restraining element, means normally maintaining said switch in a first condition, said switch being actuatable to a second condition as a consequence of the energization of said operating element, said restraining element being effective when the energized condition of said restraining element with respect to said operating element is above a predetermined magnitude to prevent the actuation of said switch to its said second condition, a first circuit connected between said terminals and including a first impedance network and said restraining element, a second circuit connected between said terminals and including said operating element, said network exhibiting an impedance which is variable as a function of the frequency of the potential supplied thereto and having a minimum value of impedance solely at a single frequency greater than said fundamental frequency, said first network acting to prevent sufficient current flow through said first circuit to energize said restraining winding to said predetermined magnitude at all frequencies above said fundamental frequency except at frequencies substantially equal to said single frequency.

10. A relay apparatus for an alternating potential system having a fundamental frequency, a pair of input terminals adapted to be energized from the potential of the system, a relay including an operating and a restraining element, a first circuit connected between said terminals and including a first impedance network and said restraining element, a second circuit connected between said terminals and including a second impedance network and said operating element, each said network exhibiting an impedance which is variable as a function of the frequency of the potential supplied thereto, said first network having a minimum value of impedance solely at a single frequency greater than said fundamental frequency, said first network acting to prevent substantial current flow therethrough at all frequencies except at frequencies substantially equal to said single frequency, said second network having a relatively low value of impedance except at said single frequency.

11. A relay apparatus for an alternating potential system having a fundamental frequency, a pair of input terminals adapted to be energized from the potential of the system, a relay including an operating and a restraining element, a first circuit connected between said terminals and including a first tuned network and said restraining element, a second circuit connected between said terminals and including a second tuned network and said operating element, said first tuned network having a minimum value of impedance solely at the second harmonic frequency, said second tuned network having a relatively low value of impedance at all frequencies except the second harmonic of said predetermined fundamental frequency, said first network acting to prevent substantial current flow therethrough at all frequencies except at frequencies substantially equal to said second frequency and said second network acting to permit substantial current flow therethrough at all frequencies except at frequencies substantially equal to said second harmonic frequency.

12. In an electrical frequency selective system for use with an alternating voltage simultaneously presenting a fundamental and harmonic frequencies of alternation, a pair of terminals adapted to be energized from the voltage, translating means including an operating element and a restraining element, a first parallel resonant circuit tuned to resonate at the second harmonic frequency of said fundamental frequency, a first connecting circuit including said first resonant circuit connecting said operating element between said terminals and being otherwise substantially free of reactive impedance whereby the impedance of said circuit decreases at frequencies above and below said second harmonic frequency, a second parallel resonant circuit including inductance and capacitative elements tuned to resonate at said fundamental frequency, an inductance element series connected with said second resonant circuit to provide a series resonant circuit, the magnitude of the inductance of said last-named inductance element being so selected with respect to the magnitude of said elements of said second resonant circuit to tune said series resonant circuit to resonate at said second harmonic frequency, and a second connecting circuit including said series resonant circuit connecting said restraining element between said terminals, said second circuit having a minimum impedance to unidirectional current.

References Cited in the file of this patent

UNITED STATES PATENTS

| | | |
|---|---|---|
| 1,823,718 | Baker | Sept. 15, 1931 |
| 1,898,752 | Wellings | Feb. 21, 1933 |
| 2,148,578 | Pullis | Feb. 28, 1939 |
| 2,231,174 | Trogner | Feb. 11, 1941 |
| 2,384,375 | Hayward | Sept. 4, 1945 |
| 2,456,541 | Stoecklin | Dec. 14, 1948 |
| 2,863,100 | Rice | Dec. 2, 1958 |

FOREIGN PATENTS

| | | |
|---|---|---|
| 623,970 | Great Britain | May 25, 1949 |